United States Patent
Chan

(10) Patent No.: US 10,124,857 B2
(45) Date of Patent: Nov. 13, 2018

(54) CLUTCH UNIT OF BICYCLE DERAILLEUR

(71) Applicant: AD-II ENGINEERING INC., Taichung (TW)

(72) Inventor: Kuei-Jung Chan, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 4 days.

(21) Appl. No.: 15/388,585

(22) Filed: Dec. 22, 2016

(65) Prior Publication Data

US 2017/0343063 A1 Nov. 30, 2017

(30) Foreign Application Priority Data

May 24, 2016 (TW) .............................. 105116155 A
May 24, 2016 (TW) .............................. 105116158 A

(51) Int. Cl.
*B62M 9/121* (2010.01)
*B60B 27/04* (2006.01)
*B62M 9/00* (2006.01)

(52) U.S. Cl.
CPC ........... *B62M 9/121* (2013.01); *B60B 27/047* (2013.01); *B62M 9/00* (2013.01)

(58) Field of Classification Search
CPC ......... B62M 9/121; B62M 9/00; F16D 41/12; F16D 41/36; F16D 41/30; B60B 27/047; B60B 27/0026
See application file for complete search history.

(56) References Cited

U.S. PATENT DOCUMENTS

| 8,852,041 | B2 | 10/2014 | Yamaguchi et al. | |
| 9,061,546 | B2* | 6/2015 | Chen | B60B 27/047 |
| 9,290,235 | B2* | 3/2016 | Yamaguchi | B62M 9/1244 |
| 2012/0083371 | A1* | 4/2012 | Yamaguchi | B62M 9/126 |
| | | | | 474/80 |
| 2012/0083372 | A1* | 4/2012 | Yamaguchi | B62M 9/126 |
| | | | | 474/80 |
| 2014/0062174 | A1* | 3/2014 | Chen | B60B 27/047 |
| | | | | 301/110.5 |

* cited by examiner

*Primary Examiner* — David J Hlavka
(74) *Attorney, Agent, or Firm* — Muncy, Geissler, Olds & Lowe, P.C.

(57) ABSTRACT

A clutch unit of a bicycle derailleur includes a main body, a cover for the main body, a positioning assembly, and a pressure-applying assembly. Both assemblies are received in a space between the main body and the cover. The main body has a top side with a receiving groove and is pivotally connected with a rotating shaft, which extends out of a bottom portion of the receiving groove. The positioning assembly includes a ratchet, a pawl, and an elastic member. The ratchet is pivotally connected in the receiving groove, can rotate with the rotating shaft, and has ratchet teeth annularly arranged at an equal spacing. The pawl is adjacent to and can move toward and away from the ratchet, has a meshing tooth for meshing with the corresponding ratchet tooth, and is elastically biased toward the ratchet by the elastic member. The pressure-applying assembly applies resistance to the ratchet.

12 Claims, 5 Drawing Sheets

CLUTCH UNIT OF BICYCLE DERAILLEUR

BACKGROUND OF THE INVENTION

1. Technical Field

The present invention relates to a bicycle derailleur and more particularly to a clutch unit capable of enhancing the precision of operation of a bicycle derailleur.

2. Description of Related Art

The conventional bicycle derailleurs, as the one disclosed in U.S. Pat. No. 8,852,041(B2), are composed essentially of a base member, a movable member, and a chain guide. The base member is configured to be fixed to the frame of a bicycle. The movable member is connected to the base member and is configured to rotate the chain guide with respect to the base member about a rotational axis perpendicular to the moving direction of the bicycle, in order for the chain guide to guide the chain of the bicycle to sprockets of different number of teeth, thereby effecting a change in speed and also providing the chain with proper tension to ensure smooth operation.

To tension the chain properly and to reduce unnecessary swinging of the chain guide due to poor road conditions, the bicycle derailleur of the '041(B2) patent is provided with a resistance-applying element that keeps the chain from irregular operation and falling off. The resistance-applying element is provided therein with a one-way clutch that allows rotation in only one direction so as to control the position to which the chain guide is rotated. In the '041(B2) patent, the one-way clutch 178 is a roller clutch, whose precision of operation depends on the number of the roller retainer 234. As the number of the roller retainer 234 is limited by the size of the rollers 230, the operation of the roller clutch cannot be further enhanced in precision, which leaves something to be desired.

BRIEF SUMMARY OF THE INVENTION

It is an objective of the present invention to provide a clutch unit configured for a bicycle derailleur and having an innovative yet simple structure that enables higher precision of operation than its prior art counterparts.

To achieve the objective, the present invention provides a clutch unit for use in a bicycle derailleur and including a main body, a cover, a positioning assembly, and a pressure-applying assembly. The cover covers the main body. Both the positioning assembly and the pressure-applying assembly are received in a space between the main body and the cover. The main body has a top side provided with a receiving groove and is pivotally connected to the rotating shaft of a chain guide, with the rotating shaft extending out of a bottom portion of the receiving groove. The positioning assembly includes a ratchet, at least one pawl, and at least one elastic member. The ratchet is pivotally connected in the receiving groove and can rotate along with the rotating shaft. The pawl is adjacent to the ratchet and can be moved toward and away from the ratchet. The elastic member biases the pawl toward the ratchet elastically. The pressure-applying assembly applies resistance to the ratchet. In particular, the ratchet is provided with a plurality of ratchet teeth that are annularly arranged at an equal spacing, and the pawl is provided with a meshing tooth for meshing with the corresponding ratchet tooth.

Compared with the clutch units of the conventional bicycle derailleurs, the clutch unit disclosed herein has an innovative and simpler structure.

Preferably, the number of the ratchet teeth is X, which is an integer greater than 2; the number of the at least one pawl is Y, which is an integer greater than or equal to 2; and the included angle between the meshing teeth of each two adjacent pawls with respect to the center of the ratchet is $360/X*N\pm(360/X)/Y$ degrees, where N is an integer greater than 0.

Hence, if the meshing tooth of one of the pawls is meshed with a certain ratchet tooth of the ratchet, rotating the ratchet by $(360/X)/Y$ degrees will cause the meshing tooth of another pawl to mesh with another ratchet tooth of the ratchet. That is to say, the precision of rotation of the rotating shaft is increased to $(360/X)/Y$ degrees, and this can be achieved without additional components.

DETAILED DESCRIPTION OF THE INVENTION

Figure 1:
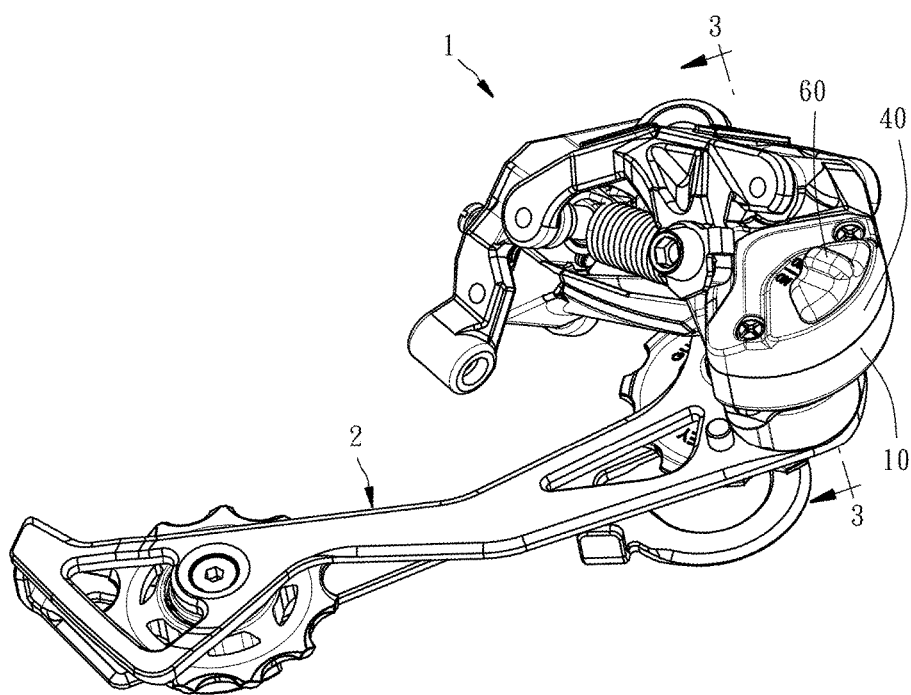
FIG. 1 is a perspective view of the clutch unit of a bicycle derailleur according to a preferred embodiment of the present invention.
Figure 2:
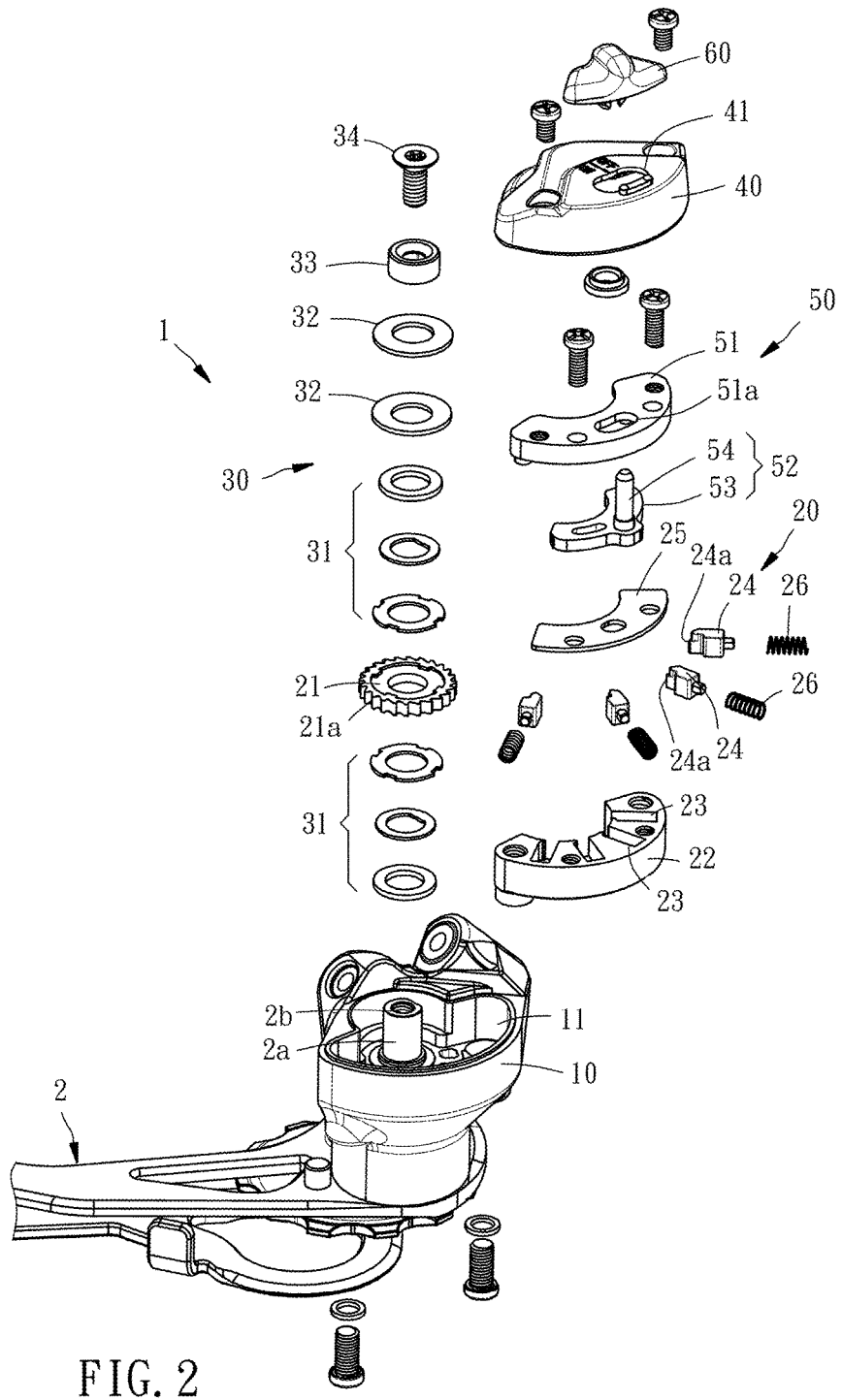
FIG. 2 is an exploded perspective view of the clutch unit in FIG. 1.
Figure 3:
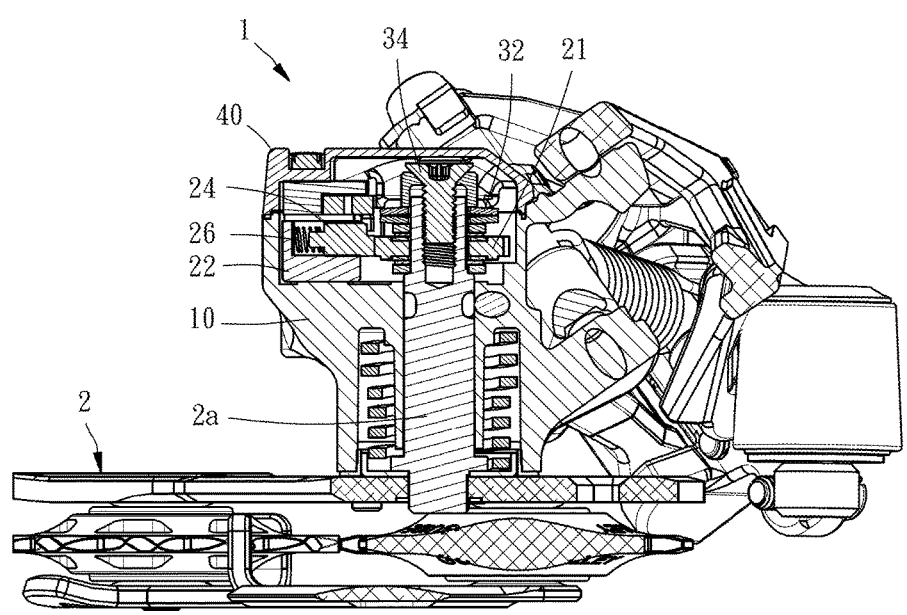
FIG. 3 is a sectional view taken along line 3-3 in FIG. 1.

Referring to FIG. 1 to FIG. 3, the clutch unit 1 according to a preferred embodiment of the present invention is configured for use in a bicycle derailleur and to be provided between a chain guide 2 and a linkage mechanism (not shown). The clutch unit 1 includes a main body 10, a positioning assembly 20, a pressure-applying assembly 30, and a cover 40 for the main body 10. The positioning assembly 20 and the pressure-applying assembly 30 are enclosed in a space between the main body 10 and the cover 40.

The main body 10 is shaped as a hollow cylinder. The side of the main body 10 that faces away from the chain guide 2 is provided with a receiving groove 11. The rotating shaft 2a of the chain guide 2 extends through the main body 10 and juts out of the center of a bottom portion of the receiving groove 11. The main body 10, therefore, is pivotally connected to the chain guide 2 and can rotate with respect to the chain guide 2. To facilitate description, the direction in which the rotating shaft 2a juts out of the receiving groove 11 is defined as the upward direction.

The positioning assembly 20 includes a ratchet 21, a retaining frame 22, at least one pawl 24, a fixing plate 25, and at least one elastic member 26. The ratchet 21 is pivotally connected in the receiving groove 11 and mounted around the rotating shaft 2a and can rotate along with the rotating shaft 2a. The circumferential surface of the ratchet 21 is provided with a plurality of ratchet teeth 21a that are annularly arranged at an equal spacing. The retaining frame 22 has two ends fastened to the main body 10 and is adjacent to the circumferential surface of the ratchet 21. The at least one pawl 24 is provided, and can slide linearly, in the at least one receiving recess 23 of the retaining frame 22. In this embodiment, there are four pawls 24 and four receiving recesses 23. Each pawl 24 has one end adjacent to the ratchet 21 and provided with a meshing tooth 24a for meshing with the corresponding ratchet tooth 21a of the ratchet 21. The fixing plate 25 is fastened to the upper side of the retaining frame 22 and covers all the receiving recesses 23. The at least one elastic member 26 in this embodiment is implemented as four compression springs, each having two ends pressing respectively against a corresponding one of the pawls 24 and the retaining frame 22 in order to bias the corresponding pawl 24 toward the ratchet 21 elastically. Each ratchet tooth 21a includes an inclined surface and a vertical stop surface such that the ratchet 21 can rotate in only one direction when any of the pawls 24 is meshed with the corresponding ratchet tooth 21a. It should be pointed out that there need not be plural pawls 24, plural receiving recesses 23, and plural elastic members 26 to enable normal operation of a bicycle derailleur; only one of each suffices, although the precision of operation will be lower, as explained below.

Figure 4:
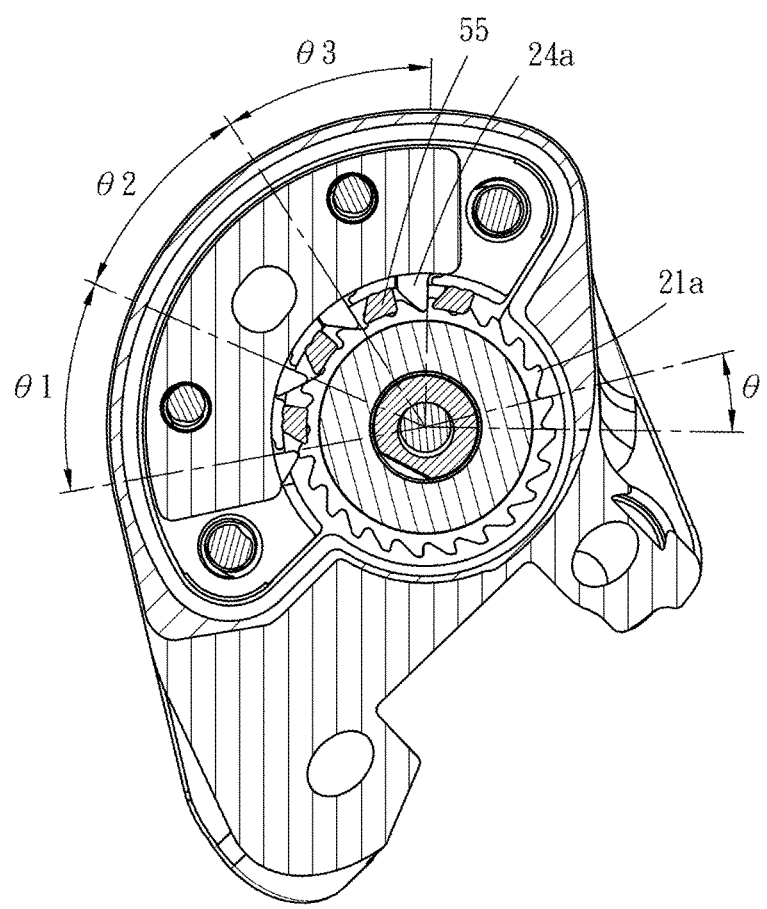
FIG. 4 is a top sectional view of the ratchet and pawls of the clutch unit in FIG. 1.

Referring to FIG. 4, the circumferential surface of the ratchet 21 in this embodiment is provided with 24 ratchet teeth 21a, so the included angle θ between each two adjacent ratchet teeth 21a with respect to the center of the ratchet 21 is 15 degrees. With a view to high-precision operation, it is necessary that plural pawls 24, plural receiving recesses 23, and plural elastic members 26 be provided. In this embodiment, the meshing teeth 24a of each two adjacent pawls 24 form an included angle θ1, θ2, or θ3 with respect to the center of the ratchet 21 (i.e., the center of the rotating shaft 2a), wherein θ1=θ2=θ3=33.75 degrees (i.e., 360/24*2+(360/24)/4, with N=2); in other words, the pawls 24 and their meshing teeth 24a are arranged at an equal angular spacing. The arrangement of the pawls 24 thus increases the precision of rotation of the positioning assembly 20 fourfold, from 15 degrees to 3.75 degrees.

In more general terms, assume there are X ratchet teeth 21a on circumferential surface of the ratchet 21 and a total of Y pawls 24, where X is an integer greater than 2 and Y is an integer greater than or equal to 2. If the pawls 24 are arranged at the same angular spacing as the ratchet teeth 21a, the precision of rotation of the positioning assembly 20 is only Δ=360/X degrees, but if the pawls 24 are arranged at the angular spacing defined by the aforesaid equation (i.e., the included angle between each two adjacent pawls 24 with respect to the center of the ratchet 21 being set at Δ degrees*N plus (Δ/Y) degrees), the precision of rotation of the positioning assembly 20 is substantially increased to Δ/Y degrees.

More specifically, not all the pawls mesh with the corresponding ratchet teeth of the ratchet at the same time. Rather, the pawls 24 in this embodiment take turns meshing with the ratchet 21. Only one pawl 24 has its meshing tooth 24a meshed with the corresponding ratchet tooth 21a of the ratchet 21 at a time. Once the ratchet 21 is rotated by (360/X)/Y degrees, the meshing tooth 24a of another pawl 24 meshes with another ratchet tooth 21a of the ratchet 21. Consequently, the precision of rotation of the rotating shaft 2a is effectively increased to (360/X)/Y degrees. If necessary, a person skilled in the art may fine-tune the values of θ1, θ2, and θ3 such that θ1≠θ2≠θ3, in order to achieve different precision.

Referring to FIG. 1 and FIG. 2, the pressure-applying assembly 30 includes two washer units 31, a pair of elastic plates 32, a collar 33, and an adjusting bolt 34. The ratchet 21 is sandwiched between the washer units 31. The elastic plates 32 and the collar 33 are mounted around the rotating shaft 2a. The adjusting bolt 34 is fastened in the threaded hole 2b in the top side of the rotating shaft 2a. The upper side of the upper elastic plate 32 abuts against the bottom side of the collar 33 while the lower side of the lower elastic plate 32 abuts against the top side of the upper washer unit 31. By rotating the adjusting bolt 34 to adjust its depth in the threaded hole 2b, the collar 33 can be moved upward or downward to change the downward pressure applied by the elastic plates 32 to the washer units 31, thereby adjusting the resistance applied by the positioning assembly 20 to the rotating shaft 2a and the chain guide 2.

As the pawls 24 are arranged at a calculated equal angular spacing, the precision of rotation of the chain guide 2 is easily enhanced without having to add any components. Furthermore, the ratchet teeth of the ratchet may alternatively be provided on the top side of the ratchet, and in that case the pawls can still be arranged at the equal angular spacing specified herein to increase precision of operation.

Figure 5:
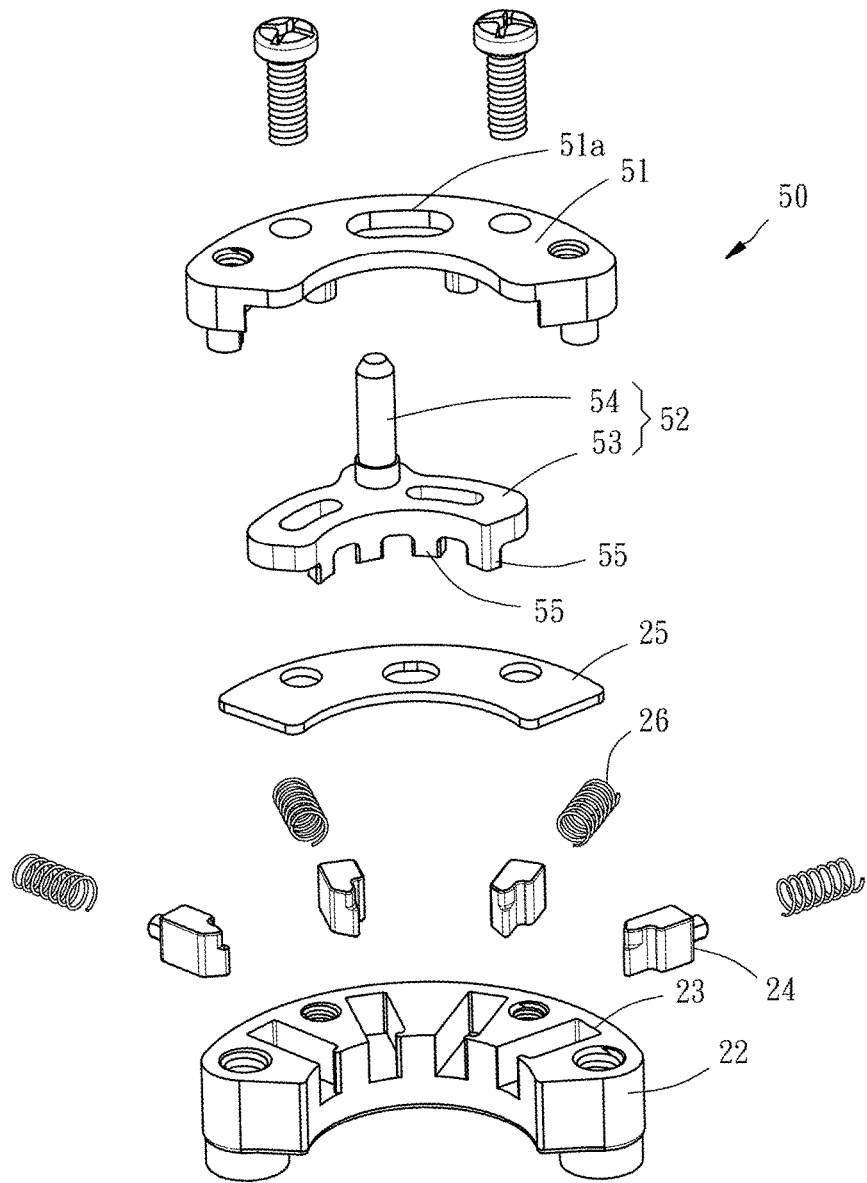
FIG. 5 is an exploded perspective view of the switch assembly and pawls of the clutch unit in FIG. 1.

Referring to FIG. 2, FIG. 4, and FIG. 5, the clutch unit 1 may further include a switch assembly 50 including a supporting frame 51 and a control member 52. The supporting frame 51 is positioned between the cover 40 and the fixing plate 25 and is formed with a slot 51a. The control member 52 includes a plate 53 and a rod 54 integrally formed with the plate 53. The plate 53 is slidably provided between the supporting frame 51 and the fixing plate 25 and includes four downwardly extending and equally spaced stop blocks 55 (see FIG. 5). The rod 54 extends upward through the slot 51a and an opening 41 of the cover 40 and has one end connected with a pushing member 60 so that a user can displace the control member 52 along the slot 51a by pushing the pushing member 60. When the control member 52 is at one end of the slot 51a, the stop blocks 55 are not in the moving paths of the pawls 24 and therefore allow the pawls 24 to move freely and work as intended (see FIG. 4). When the control member 52 is at the other end of the slot 51a, however, the stop blocks 55 are in the moving paths of the pawls 24 respectively, thus blocking the pawls 24 and confining them in their respective receiving recesses 23 so the chain guide 2 can rotate with respect to the main body 10 in both directions. It should be pointed out that the number of the stop blocks 55 may be adjusted according to that of the pawls 24. When there is only one pawl 24, for example, one stop block 55 is enough to enable the switching operation.

While the present invention is described herein with reference to the foregoing preferred embodiment, it should be understood that the embodiment is provided for illustrative purposes only and is not intended to be restrictive of the invention or its mode of implementation.

What is claimed is:

1. A clutch unit of a bicycle derailleur, comprising:
   a main body having a top side provided with a receiving groove, the main body being pivotally connected with a rotating shaft, the rotating shaft extending out of a bottom portion of the receiving groove;
   a positioning assembly comprising a ratchet, at least one pawl, and at least one elastic member, wherein the ratchet is pivotally connected in the receiving groove and is rotatable along with the rotating shaft, the at least one pawl is adjacent to the ratchet and is movable toward and away from the ratchet, and the at least one elastic member biases the at least one pawl toward the ratchet elastically;
   a cover covering the main body; and
   a pressure-applying assembly provided between the main body and the cover to apply an axial resistance along an axis of the rotating shaft to the ratchet;
   wherein the ratchet is provided with a plurality of ratchet teeth annularly arranged at an equal spacing, and the at least one pawl each is provided with a meshing tooth for meshing with the plurality of ratchet teeth.

2. The clutch unit of claim 1, wherein the plurality of ratchet teeth are provided with a quantity of X, which is an integer greater than 2; the at least one pawl is provided with a quantity of Y, which is an integer greater than or equal to 2; each two adjacent said plurality of ratchet teeth form an included angle of 360/X degrees with respect to a center of the ratchet; and the meshing teeth of each two adjacent said at least one pawl provided with the quantity of Y form an included angle of 360/X*N ±(360/X)/Y degrees with respect to the center of the ratchet, with N being an integer greater than 0.

3. The clutch unit of claim 2, wherein the main body is shaped as a hollow cylinder.

4. The clutch unit of claim 1, wherein the plurality of ratchet teeth are provided on a circumferential surface of the ratchet at the equal spacing, the positioning assembly further comprises a retaining frame fastened to the main body and adjacent to the ratchet, the retaining frame has at least one receiving recess, the at least one pawl each is slidably and correspondingly provided in the at least one receiving recess, and the at least one elastic member each is correspondingly provided in the at least one receiving recess.

5. The clutch unit of claim 2, wherein the ratchet teeth are provided on a circumferential surface of the ratchet at the equal spacing; the positioning assembly further comprises a retaining frame fastened to the main body and adjacent to the ratchet; the retaining frame has a plurality of receiving recesses; the pawls are respectively and slidably provided in the receiving recesses; and the elastic members are respectively provided in the receiving recesses.

6. The clutch unit of claim 5, wherein the positioning assembly further comprises a fixing plate fastened to the retaining frame and covering the plurality of receiving recesses, and each of the elastic members has two ends pressing against a corresponding one of the pawls and the retaining frame respectively.

7. The clutch unit of claim 5, wherein each of said plurality of ratchet teeth comprises an inclined surface and a vertical stop surface.

8. The clutch unit of claim 2, wherein the pressure-applying assembly comprises a pair of washer units, a pair of elastic plates, a collar, and an adjusting bolt; the elastic plates and the collar are mounted around the rotating shaft; the adjusting bolt is fastened in a threaded hole in a top side of the rotating shaft; each said washer unit has a side pressed against the ratchet; the elastic plates have opposite sides abutting against a top side of an adjacent said washer unit and a bottom side of the collar respectively; and the collar is movable upward and downward by adjusting a depth of the adjusting bolt in the threaded hole.

9. The clutch unit of claim 1, further comprising a switch assembly, wherein the switch assembly comprises a supporting frame and a control member, the supporting frame is positioned between the cover and the positioning assembly, the control member is slidably provided between the supporting frame and the positioning assembly and is extended with at least one stop block, and the at least one stop block is movable toward and away from moving path of the at least one pawl.

10. The clutch unit of claim 2, further comprising a switch assembly, wherein the switch assembly comprises a supporting frame and a control member, the supporting frame is positioned between the cover and the positioning assembly, the control member is slidably provided between the supporting frame and the positioning assembly and is extended with a plurality of stop blocks, and the plurality of stop blocks are arranged at an equal spacing and are movable toward and away from moving paths of the pawls respectively.

11. The clutch unit of claim 10, wherein the supporting frame is formed with a slot, the control member is composed of a rod and a plate, the rod extends through the slot and the cover, and the stop blocks extend from the plate.

12. The clutch unit of claim 11, wherein the rod has an end extending out of the cover and connected with a pushing member.

* * * * *